United States Patent [19]

Glowacki et al.

[11] Patent Number: 4,522,562
[45] Date of Patent: Jun. 11, 1985

[54] TURBINE ROTOR COOLING

[75] Inventors: Pierre A. Glowacki, Melun; Gérard M. F. Mandet, Epinay sous Senart, both of France

[73] Assignee: Societe Nationale d'Etude et de Construction de Moteurs d'Aviation S.N.E.C.M.A., Evry, France

[21] Appl. No.: 97,741

[22] Filed: Nov. 21, 1979

[30] Foreign Application Priority Data

Nov. 27, 1978 [FR] France ............................ 78 33382

[51] Int. Cl.³ .............................................. F01D 5/18
[52] U.S. Cl. ...................................... 416/95; 415/116
[58] Field of Search ............ 415/115, 116; 416/90 R, 416/93 R, 95

[56] References Cited

U.S. PATENT DOCUMENTS 3,600,890  8/1971  White et al. ................... 416/95
3,814,539  6/1974  Klompas ....................... 415/115
4,102,603  7/1978  Smith et al. ................... 416/95

FOREIGN PATENT DOCUMENTS 2292866  6/1976  France .

Primary Examiner—Stephen C. Bentley
Attorney, Agent, or Firm—Bacon & Thomas

[57] ABSTRACT

The present invention concerns the cooling of turbine rotors, especially those of aircraft turboreactors, and discloses a turbine disc equipped with two sets of channels bored respectively close to each of the sides of the disc and in conformity with its profile, in which flows the cooling air of the turbine blades in order to superficially cool the disc.

7 Claims, 8 Drawing Figures

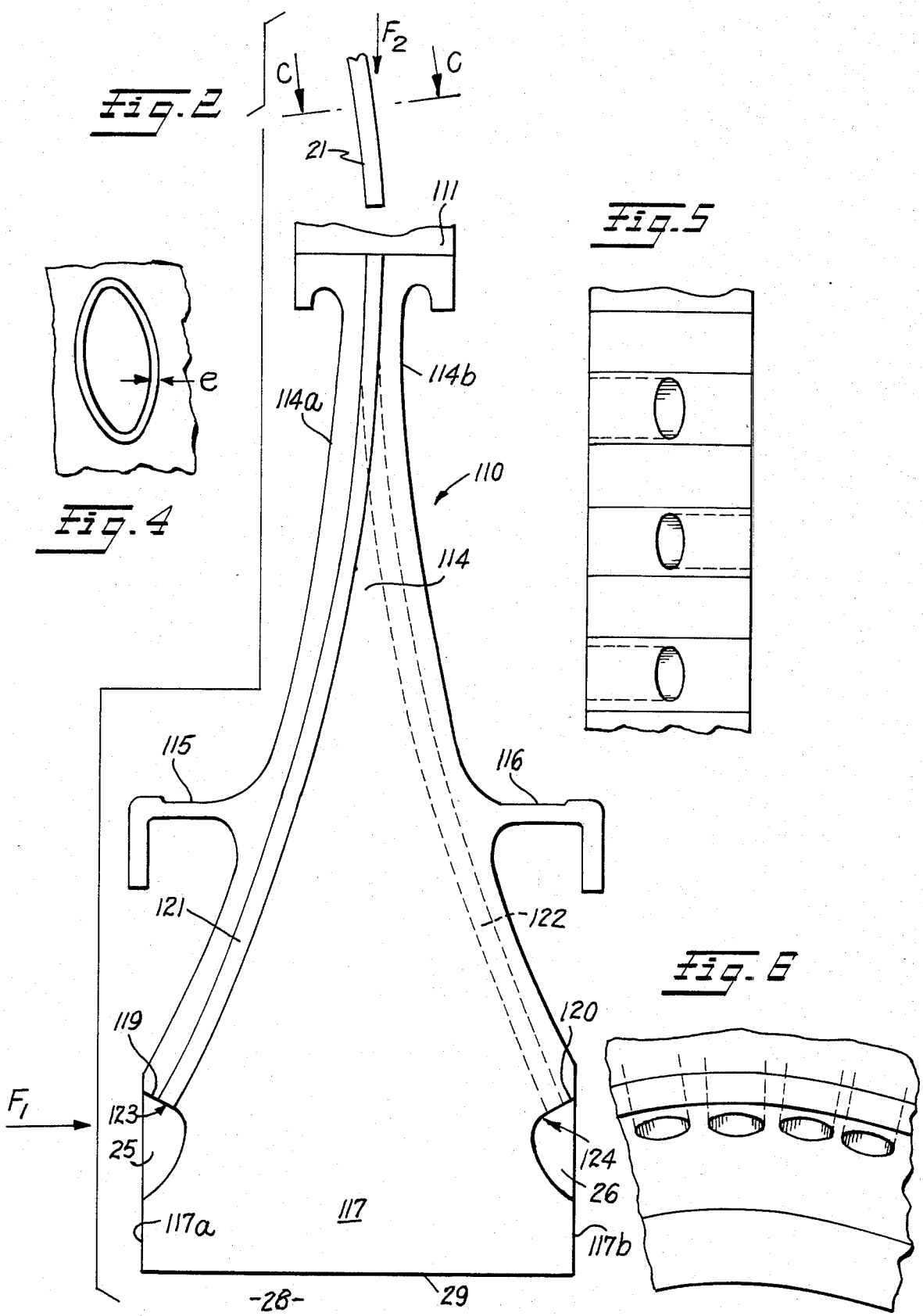

TURBINE ROTOR COOLING

BACKGROUND OF THE INVENTION

1. Field of the Invention

The present invention relates to the cooling of turbine rotors, especially gas turbines, and, more particularly, to airplane turboreactors.

2. Description of the Prior Art

The need has long been acknowledged to cool the mobile blades of gas turbines, especially of airplane turboreactors, and, in this regard, it is known that a cooling fluid, in most cases air, is circulated through tubes which cross the blades radially. However, the present technological trend is to always increase the rotation velocity of the turbines and the temperature of the hot gases which propel them. Thus, the rotor discs which carry the blades of modern turbines are subjected to high outward-flow pull and elevated temperatures which reduce their mechanical resistance. Therefore, research has also focussed on cooling the turbine discs which, as a result of their heavy load, include a very thick ring-shaped base and a disc which thins out gradually to the rim which supports the blades. It is already known (French patent application No. 2,292,866, published) that, in this regard, the cooling fluid can be circulated through channels in the turbine disc which supports these blades. With respect to familiar modes of implementation, these channels are bored in the disc gradually, or their center lines are located in its cross plane of symmetry.

SUMMARY OF THE INVENTION

The object of the present invention is two-pronged. First of all, it is designed to guarantee better turbine disc resistance to outward-flow pull by improving its cooling. Then, it is geared to enhancing air centrifuging inside the tubes or channels bored into the disc to convey air at a sufficient pressure level at the entrance of the air intake openings of the blades.

In conformity with this invention, the turbine disc is equipped with channels which guarantee superficial cooling of the disc and, in this regard, these channels do not cross it radially, but include two sets of channels which are bored respectively close to each of the sides of the disc and according to their profile. Based on a specific aspect of this invention, the channels are executed by the familiar method of electrolytic tooling.

In the case of one embodiment of the present invention, the two sides of the turbine disc are truncated throughout most of their surface, and the channels are rectilinear. However, the arrangement consisting in providing both sides of the disc with a curved profile will be preferably used, advantageously like an arc of a circle, which makes it possible to limit the mass of the disc and the concentrations of constraints, and to bore channels with curved electrodes.

Preferably, the channels have an oval section, the major axis of which is arranged sectionally to the shaft of the turbine, or parallel with the sides of the disc. In fact, it has been determined that boring these channels with elliptically sectioned electrodes produces streaks on the insulating layer of the electrodes and that these streaks are the cause of electrical arcs which disturb the geometrical shape of the channels, and that this inconvenience may be resolved by using electrodes, on which the oval-shaped section offers, at the extremities of the major axis, a greater radius of curvature than the corresponding radius of curve of an ellipse.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views, and wherein:

FIG. 2 is a view of the modified cooled turbine disc of FIG. 3; and

FIG. 4 is a view of the end of the channel 114a on an enlarged scale;

FIG. 5 is a view of the device as seen from the line C—C of FIG. 2;

FIG. 6 is a fragmentary side view as seen along the arrow $F_1$ of FIG. 2.

DETAILED DESCRIPTION OF THE PREFERRED EMBODIMENTS

Figure 1:
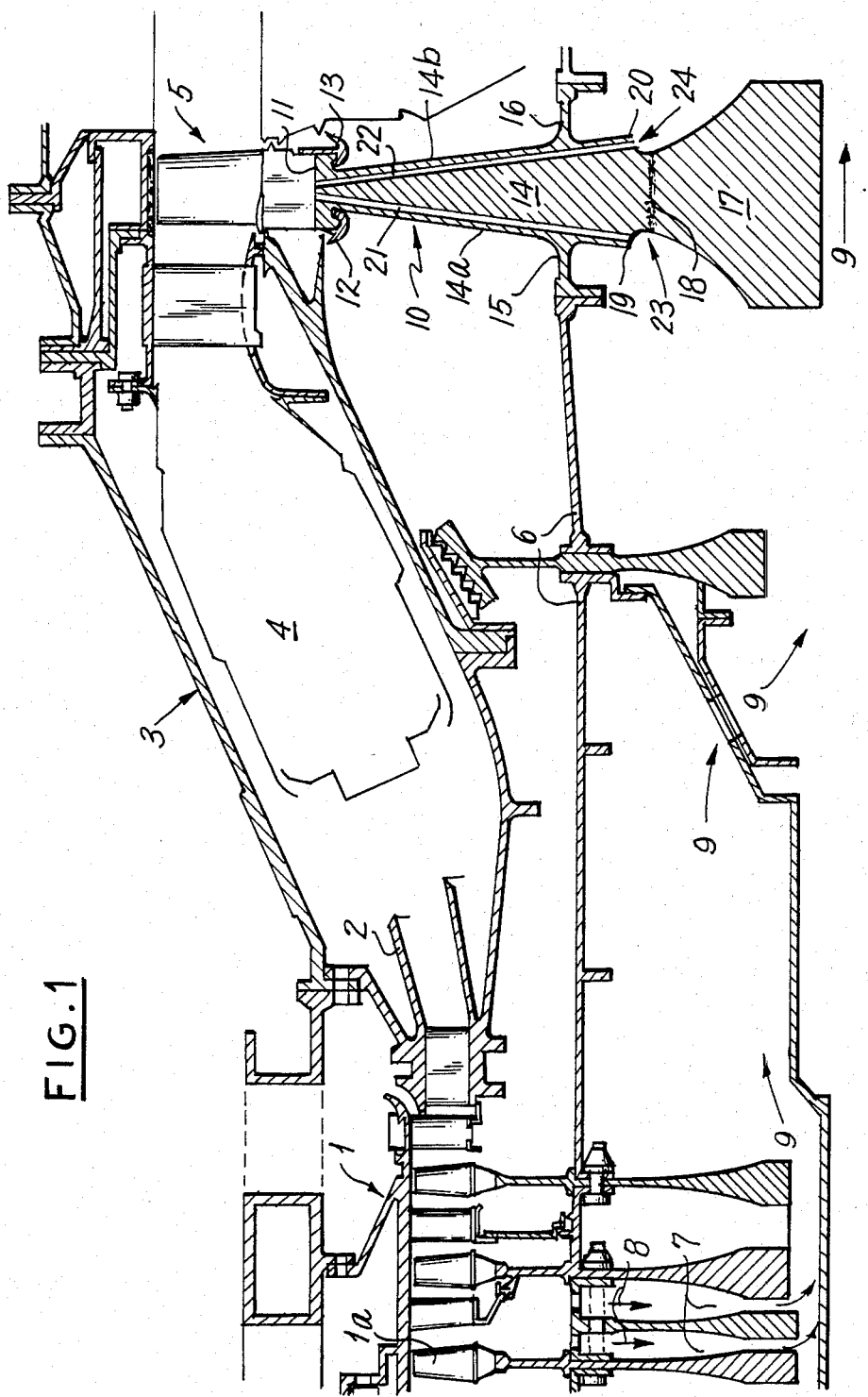
FIG. 1 is a longitudinal half-section of a portion of an airplane turboreactor, which shows a cooled turbine disc according to the present invention.

Referring now to the drawings, and more particularly to FIG. 1, the turboreactor is shown to include a compressor 1 which discharges compressed air into a diffuser 2 leading to a ring-shaped crankcase 3 containing a combustion chamber 4 in which fuel burns to create hot gases which work in a turbine, the first mobile blading of which is depicted generally by the numeral 5. The mobile bladings of the compressor 1 are linked to those of the turbine by a hollow shaft 6, through which their rotation is transmitted. The hot gases which exit from the turbine are unloaded into the atmosphere by an exhaust, which is not represented, thus creating a propelling jet.

The turbine rotor is cooled by air sampled at the exit of a stage 1a of the compressor 1 by way of a device 7 similar to that which is described in the U.S. Pat. No. 4,231,704 of the Applicant. The air is sampled in a centripetal direction according to the arrows 8, and flows downward according to the arrows 9 inside the hollow shaft 6.

In the depicted embodiment, the turbine disc 10 which carries the blades 5 includes a rim 11 inside which are bored, parallel with the turbine axis, cups where the stems of the blades 5 are fitted in and maintained by flanges 12 and 13, a disc 14, the upward sides 14a and 14b of which are truncated and equipped with arms 15, 16 set into the hollow shaft 6, and a massive ring-shaped base 17 linked to the disc 14 by an intermediary portion 18 and two steps 19, 20. In each cup, two rectilinear bores 21 and 22 are respectively formed, through electrolytic tooling, right next to the sides 14a and 14b (or much closer to these sides than the median plane of the disc) and parallel therewith, as with the steps 19 and 20. The electrolytic boring technique is well known and, because of this, detailed description is deemed unnecessary. It will simply be noted that the technique involves applying a positive potential to the piece being bored and a negative potential to an electrode 21 (FIG. 2) which is brought close thereto and in which, or along which, flows an electrolyte.

The cooling air which flows in the direction 9 in the hollow shaft 6 penetrates, respectively, according to arrows 23 and 24, the channels or bores 21 and 22, through which the cooling air is unloaded into the bottom of the cups, from where it flows into channels (not represented), radially produced into the blades 5, to cool them. Thus, by circulating inside channels 21 and 22, right next to sides 14a and 14b of disc 10, or right near the hot gases which surround the portion of that disc located outside of the hollow shaft 6, the air cools the disc 10 more efficiently than if it were circulated in its median plane as was formerly done.

Figure 2A:
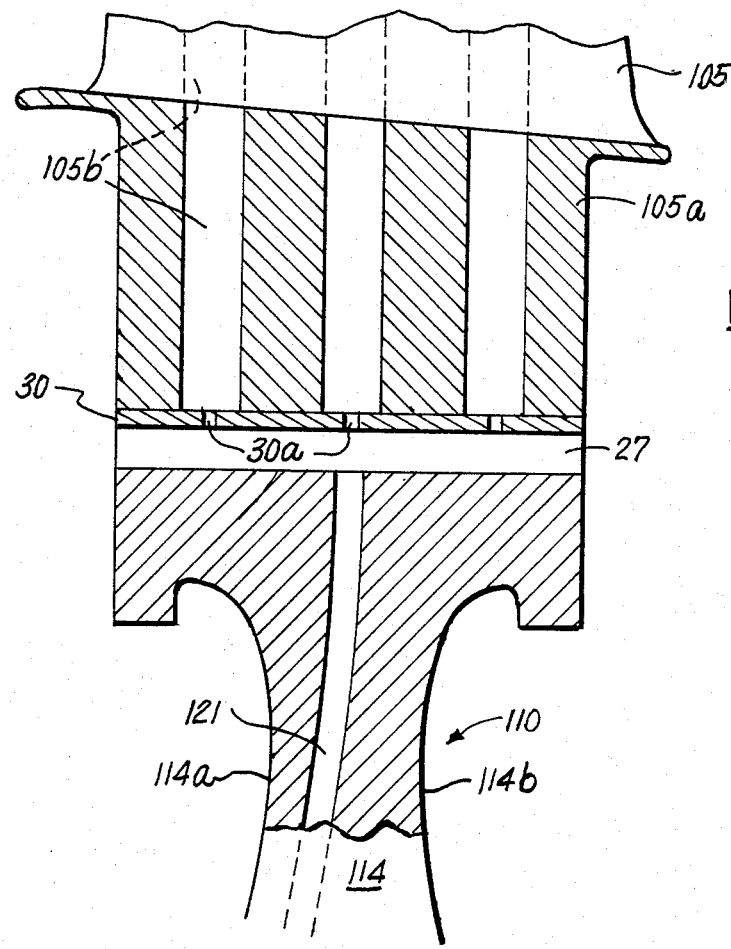
FIG. 2a is a partial axial section of a modified cooled turbine disc, also shown extremely enlarged.

In the embodiment of FIG. 2, where the elements which play the same role as in FIG. 1 are designated by the same reference numbers increased to the 100 unit, the upward and downward sides 114a and 114b of disc 114 have a circular profile, and two circular necks 25, 26 are tooled respectively at their junction with the upward and downward edges 117a, 117b of the massive ring-shaped base 117. Bores 121 and 122 conform respectively with the circular arc-shaped profiles of sides 114a and 114b, and have an oval-like section, of which the major axis is arranged sectionally to the turbine axis, or perpendicularly to the figure plane. This oval-like section permits an increase in the heat exchange area in the vicinity of the sides of the disc. The bores 121 and 122 are formed by electrolytic boring with circle arc-shaped electrodes 21 with oval-like sections. Also, a single boring leads to each cup, so that the cups are fed with cooling air, alternately one with an upward borehole 121 and the other by a downward borehole 122. In FIG. 2a, thus, there is a cup 27 fed by an upward borehole 121 which leads to the middle of its length, while the two adjacent cups for adjacent blades 105 will be fed by a downward borehole 122 which also leads to the middles of their lengths.

In order to prevent the loss of pressure of the flow of cooling air, in passing through 28 of bore 29 from disc 110 to reach its downward side and a compensatory loss of pressure is created on the cooling circuit of the blades fed from the upward side of the disc by pierced pads 30 inserted under the stem 105a of the blades 105. In order to facilitate balance, pierced pads with holes of greater diameter than the holes 30a of pads 30 are inserted under the stems of the blades which are fed from the downward side. It would obviously not be a departure from the framework of the invention if the pads were replaced by equivalent means, as for example, by executing boreholes 122 of larger diameter than boreholes 121. The two sets of boreholes can be achieved with identical electrodes, by playing with the debit of the electrolyte or the time span of tooling, or both.

In FIG. 2a, the stem 105a of a blade 105 is illustrated, being fitted into the cup 27, as well as the channels 105b radially formed in the blade 105 and its stem 105a for the flow of cooling air from the blade, but the flanges (depicted as 12 and 13 on FIG. 1), which maintain the stem of the blades in the cups and prevent air leaks, are not represented in FIGS. 1a to 2a and 3.

FIG. 5, where the elements which play the same role as in FIG. 2 are designated by the same reference numbers increased to the additional 100 unit, shows a variation where the circular necks 25 and 26 from FIG. 2 are eliminated and boreholes 221 and 222 lead to edges 217a and 217b of disc 210. This arrangement is preferred to that of FIG. 2 because the boreholes lead closer to the turbine axis, so that recompression of cooling air in the boreholes by outward flow action will be more significant.

Comparing the embodiment of FIG. 1 with that of FIGS. 2 and 2a the latter two are quite clearly favored. Indeed, in the embodiment of FIG. 1, the collar at the right of the steps 19 and 20 constitutes an area which has been located in 18, in broken lines inside FIG. 1, which is the source of concentration of very unfavorable constraints with respect to the longevity of the disc. In that area, the tangential constraint is almost equal to the radial constraint, and could unleash the splintering of the disc in operation if a significant margin of security were not respected.

Figure 1A:
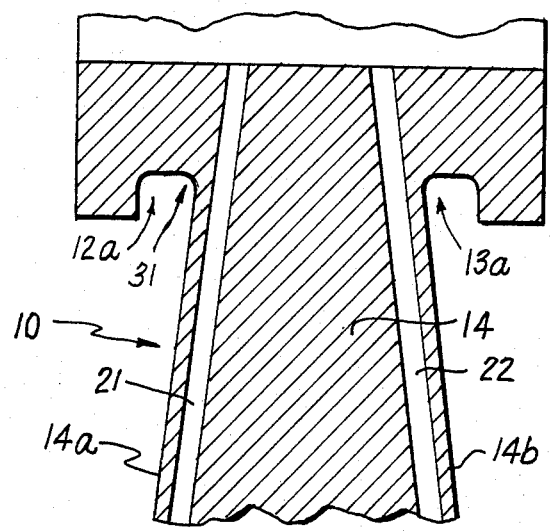
FIG. 1a is a partial axial section of the turbine disc in FIG. 1, shown extremely enlarged.
Figure 3:
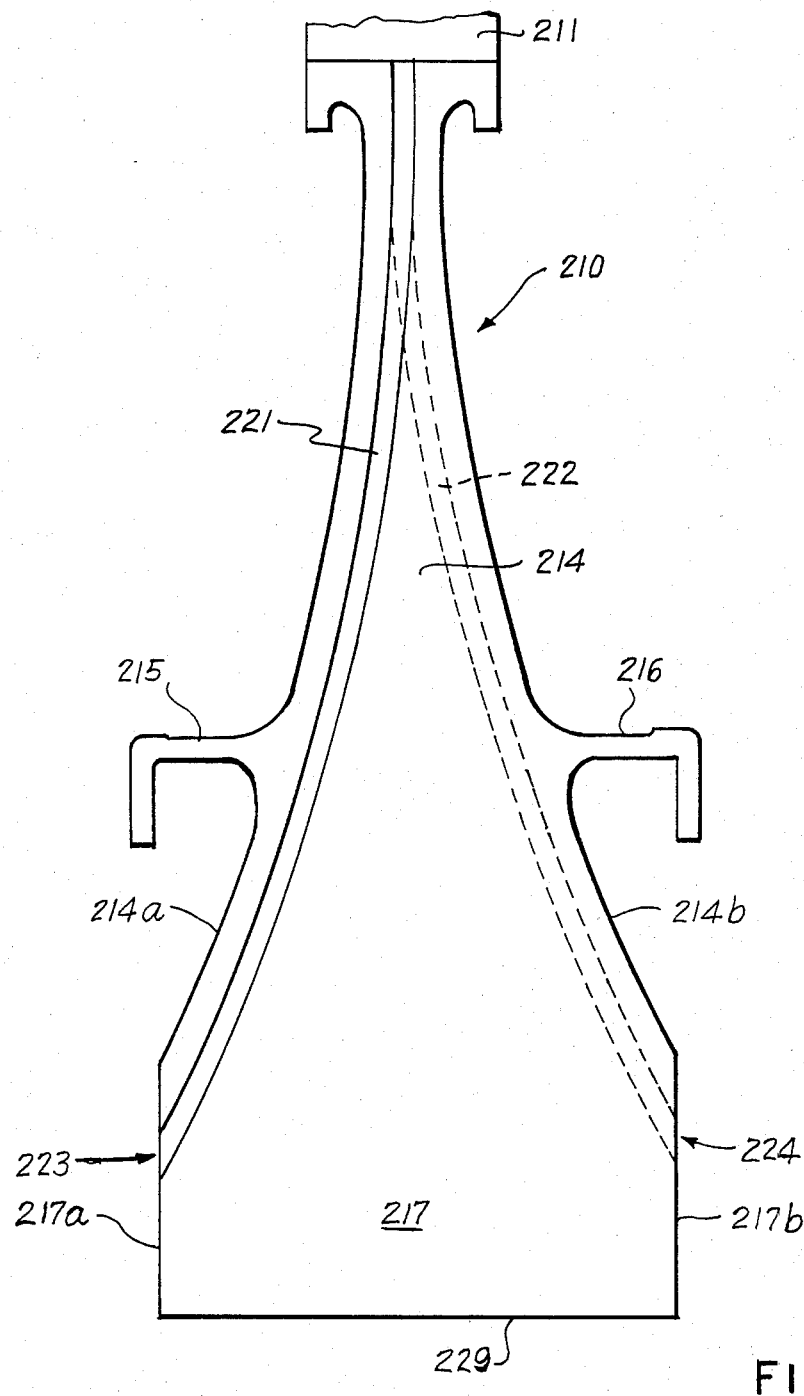
FIG. 3 is a view, similar to FIG. 2, which shows another embodiment of the turbine disc.

In the embodiment of FIGS. 2a and 3, it can be seen that the holes, in fewer numbers, are more embedded into the mass of the disc and the collar area is less critical, chiefly because of the absence of a collar in the embodiment of FIG. 3, and because of the lower position of the collar for the FIG. 3 embodiment, at a level where constraints are less, especially radial constraints. A priori, in a surprising way, the curvilinear tracing of the boreholes offers additional advantages with respect to manufacturing and execution of electrodes. In the embodiment of FIGS. 1 and 1a, two boreholes are anticipated for each blade. Those boreholes are formed, for example, 3 mm from the surface of the disc. But, in the case of elliptical electrodes, which have for instance a minor axis of 2.1 mm and a major axis of 7.5 mm for a boring length of 150 mm (electrode length is 350 mm) any deficiency in the linearity of the electrodes will be felt upon the tracing of the holes, and the latter, in some cases, could have zero tolerance. Also, the tolerance levels at the site of the outlet of the holes are very tight, because the hole exits are located in the disc collar area which has an extremely critical constraint level. The boring operation is therefore extremely delicate because of its great sensitivity at the beginning of the holes. On the other hand, the disc volume which is included between the truncated envelope of the boreholes and the external skin, because of its thinness, does not participate in the maintenance of the disc, but rather is a dead mass uselessly adding to the outward-flow constraints of the disc, which must be compensated by an increased thickness of the latter.

In the embodiment of FIGS. 2a and 3, there is only one borehole per blade, so that the boreholes can lead out onto the middle of the length of the cups. Since the boreholes are less numerous, hence better embedded into the mass of the disc, the volume included between the holes and the sides of the disc can participate in the maintenance of the disc. A fault in the curvature of the electrodes is therefore less critical than a fault in linearity within the embodiment of FIG. 1. This peculiarity alone permits a substantial reduction of the mass of the disc, which bears tremendous importance with respect to the constraints, and can appear paradoxical because the number of boreholes, hence the removal of matter, is diminished.

Also, with respect to the execution of electrodes, the embodiments of FIGS. 2a and 3 are preferable to that of FIG. 1. Because there are less boreholes, they must have a larger section, and therefore they possess greater inertia (inertia varies like the power 4 of the diameter; if the minor axis of the ellipse is multiplied by 2, inertia is multiplied by 16). The electrode is more stable in position. An increase in inertia of the electrode substantially compensates for an increase in its length because of its curvature (20%). As a result of the ability to increase the section, electrolyte feeding and especially its evacuation are much more facilitated.

As indicated earlier, the boreholes are formed with electrodes with oval-like sections. This section can be elliptical, but electrodes will be used generally, when the oval-like section offers, at the extremities of its major axis, a radius of curvature which is greater than the corresponding radius of curvature of an ellipse. An electrode with such an oval-like section, "in the shape of a basket handle", allows the electrolyte to circulate more freely between the electrode and the piece to be bored and provides better tooling of boreholes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A turbine disc having means therein for circulating a cooling fluid for the blades supported by the disc, said cooling fluid circulating means comprising channels non-radially bored therein respectively close to each of the sides of the disc and conforming with their profile, the sides of the disc and the channels having a curved profile, advantageously in the shape of an arc of a circle, and the channels leading to the middle of the length of the cups which support the stem of the blades.

2. A turbine disc according to claim 1 wherein the cups which support the stem of the blades are fed by a cooling fluid, alternately one through a channel parallel with the upward side of the disc, and the other through a channel parallel with the downward side.

3. A turbine disc according to claim 2, wherein the channels parallel with the upward side lead out onto the upward part of the disc and those which are parallel with the downward side lead out onto the downward part, in order to collect in the vicinity of a turbine shaft supporting said turbine disc air which constitutes the cooling fluid.

4. A turbine disc according to claim 3, further comprising means for creating, on the cooling circuit of the blades fed from the upward side of the disc, a loss of pressure which compensates for the loss of pressure of the flow cooling air when it crosses the bore of the disc to reach its downward side.

5. A turbine disc according to claim 1 wherein the channels possess an oval-like section, of which the major axis is positioned parallel with the sides of the disc.

6. A turbine disc according to claim 1 wherein the channels are electrolytically bored in said disc.

7. A turbine disc according to claim 6, wherein the electrolytic boring is performed with electrodes, of which the oval-like section offers, at the extremities of its major axis, a radius of curvature which is greater than the corresponding radius of curvature of an ellipse.

* * * * *

UNITED STATES PATENT AND TRADEMARK OFFICE
CERTIFICATE OF CORRECTION

PATENT NO. : 4,522,562

DATED : June 11, 1985

INVENTOR(S) : GLOWACKI et al

It is certified that error appears in the above-identified patent and that said Letters Patent is hereby corrected as shown below:

Col. 3, lines 41 and 42, delete: ", in passing through 28 of bore 29 from disc 110 to reach its downward side," and insert: -- from possibly producing heterogeneity in the cooling of the blades, --.

Signed and Sealed this

Twenty-ninth Day of October 1985

[SEAL]

Attest:

DONALD J. QUIGG

Attesting Officer

Commissioner of Patents and Trademarks—Designate

UNITED STATES PATENT AND TRADEMARK OFFICE
CERTIFICATE OF CORRECTION

PATENT NO. : 4,522,562

DATED : June 11, 1985

INVENTOR(S) : GLOWACKI et al

It is certified that error appears in the above-identified patent and that said Letters Patent is hereby corrected as shown below:

Col. 2, line 20: "Fig. 3" should read -- Fig. 2a --.

Signed and Sealed this

Third Day of December 1985

[SEAL]

Attest:

DONALD J. QUIGG

Attesting Officer

Commissioner of Patents and Trademarks